United States Patent Office 3,338,955
Patented Aug. 29, 1967

3,338,955
BENZENESULFONYL UREAS AND PROCESS FOR PREPARING THEM
Walter Aumüller, Kelkheim, Taunus, Helmut Weber and Rudi Weyer, Frankfurt am Main, Karl Muth, Kelkheim, Taunus, and Heinz Herr, Frankfurt am Main, Germany, assignors to Farbwerke Hoechst Aktiengesellschaft vormals Meister Lucius & Bruning, Frankfurt am Main, Germany, a corporation of Germany
No Drawing. Filed Dec. 8, 1964, Ser. No. 416,884
Claims priority, application Germany, Dec. 14, 1963, F 41,546, Patent 1,188,589
10 Claims. (Cl. 260—470)

The instant invention relates to compounds of the formula

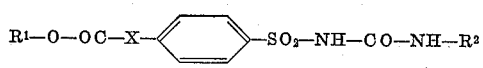

and their salts which are valuable medicaments characterized by a strong and, in particular, a long lasting hypoglycemic action. In the above-mentioned formula
$R^1$ represents lower alkyl, cycloalkyl of 5 to 8 carbon atoms or lower cycloalkylalkyl of 5 to 8 ring carbon atoms,
X represents hydrocarbon of 1 to 2 carbon atoms,
$R^2$ stands for
  (a) alkyl, alkenyl or mercaptoalkyl of 2 to 8 carbon atoms,
  (b) alkoxyalkyl, alkylmercaptoalkyl or alkylsulfinylalkyl of 4 to 8 carbon atoms of which at least two belong to the alkylene part of alkoxyalkyl, alkylmercaptoalkyl or alkylsulfinylalkyl,
  (c) lower phenylalkyl, phenylcyclopropyl,
  (d) lower cyclohexylalkyl, cycloheptylmethyl, cycloheptylethyl or cyclooctylmethyl,
  (e) endoalkylene - cyclohexyl, endoalkylene - cyclohexenyl, endoalkylene - cyclohexylmethyl or endoalkylene-cyclohexenylmethyl of 1 to 2 endoalkylene-carbon atoms,
  (f) lower alkylcyclohexyl, lower alkoxycyclohexyl,
  (g) cycloalkyl of 5 to 8 carbon atoms,
  (h) cyclohexenyl, cyclohexenylmethyl,
  (i) a heterocyclic ring of 4 to 5 carbon atoms and one oxygen or sulfur atom as well as up to two ethylenic double linkages or
  (k) a heterocyclic ring of 4 to 5 carbon atoms and one oxygen or sulfur atom linked to the nitrogen atom by means of a methylene radical and containing up to two ethylenic double linkages.

The present invention furthermore relates to a process for preparing the said benzenesulfonyl-ureas. As processes for the preparation there are named:

(a) The reaction of a $R^1$—O—OC—X-substituted benzene-sulfonamide, suitably in the form of its salt, with $R^2$-substituted isocyanates, carbamic acid esters, thiocarbamic acid esters, carbamic acid halides or ureas;

(b) the reaction of a $R^2$-substituted amine or of its salt with $R^1$—O—OC—X-substituted benzenesulfonyl - isocyanates, benzenesulfonyl-carbamic acid esters, benzenesulfonyl-thiocarbamic acid esters, benzenesulfonyl carbamic acid halides or benzenesulfonyl ureas;

(c) the reaction of a $R^1$—O—OC—X-substituted benzenesulfochloride with $R^2$-substituted ureas, isourea ethers, isothiourea ethers or parabanic acids and, if desired, subsequent hydrolysis of the benzenesulfonyl-isourea ethers, benzenesulfonyl-isothiourea ethers or benzenesulfonyl-parabanic acids obtained in the way described above or by another method;

(d) the exchange of the sulfur atom in benzenesulfonyl-thioureas of the formula

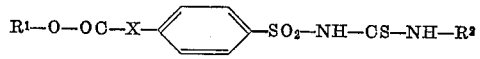

against an oxygen atom;

(e) the oxidation of correspondingly built up benzenesulfenyl- or -sulfinyl-ureas.

If desired, carboxylic acids formed in said reactions or in another way and corresponding to the formula

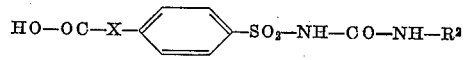

may be esterified with alcohols of the formula $R^1OH$ in order to obtain the esters defined above. The benzenesulfonyl-ureas obtained may then be treated with alkaline agents in order to form salts.

Instead of an $R^2$-substituted isocyanate or a $R^1$—O—OC—X-substituted benzenesulfonyl-isocyante there may likewise be used as starting substances compounds which in the course of the reaction form isocyanates or react like isocyanates. As carbamic acid halides there are suitable, above all, the chlorides.

As $R^2$-substituted urea for the syntheses mentioned sub (a) those of the formula $R^2$—NH—CO—$NH_2$ or acylated ureas of the formula $R^2$—NH—CO—NH-acyl, in which acyl represents a preferably low-molecular aliphatic or aromatic acid radical or the nitro group, or diphenyl-ureas of the formula $R^2$—NH—CO—$N(C_6H_5)_2$ (the phenyl radicals being substituted or linked directly or by means of a bridge such as —$CH_2$—, —NH—, —S—, or —O—) or N,N'-disubstituted ureas of the formula $R^2$—NH—CO—NH—$R^2$ may be used.

Furthermore, it is possible to convert into the desired compounds corresponding benzenesulfonyl-ureas unsubstituted at the side of the urea molecule opposite to the sulfonyl-group or mono- or disubstituted by alkyl radicals or aryl radicals, by reaction with amines corresponding to the formula $R^2NH_2$, if desired in the form of their salts. Instead of benzenesulfonyl-ureas substituted in the above-described way, the corresponding N-benzenesulfonyl-N'-acyl-ureas or the bis-(benzenesulfonyl)-ureas may likewise be used. It is, for instance, possible to treat said bis-(benzenesulfonyl)-ureas or N-benzenesulfonyl-N'-acyl-ureas with amines of the formula $R^2NH_2$ and to heat the salts obtained to elevated temperatures, favorably to at least 100° C.

Advantageously, the above-mentioned carbamic acid esters or benzenesulfonyl-carbamic acid esters as well as the corresponding thio-esters contain in the ester component a low-molecular alkyl radical or a phenyl radical.

In order to eliminate in correspondingly substituted benzenesulfonyl-thioureas the sulfur atom it is possible to treat them with oxides or salts of heavy metals or likewise with oxidizing agents such as hydrogen peroxide, sodium peroxide, or nitrous acid.

Another possibility of preparing the compound consists in converting carboxylic acids of the formula

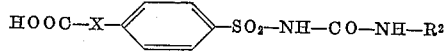

into esters by introducing the radical $R^1$. Sometimes, these carboxylic acids are formed to a lower or higher extent by hydrolysis of the carboxylic ester grouping during the course of the reactions defined under (a) to (e) above, They are, however, likewise accessible by direct synthesis, for example by the reactions described sub (a) to (e), if instead of the benzenesulfonyl compound carrying an ester group a benzenesulfonyl compound carrying a carboxylic acid group is used.

Generally, the methods of materializing the process according to the invention may vary within wide limits as regards the reaction conditions, and they may be adapted to each individual case. The reactions may be carried out, for instance, by using solvents, at room temperature or at an elevated temperature.

By additional hydrogenation the above-mentioned sulfonyl-ureas carrying the grouping X=—CH=CH— may be coverted into compounds with the grouping $$X = -CH_2-CH_2-$$

As starting substances there are used on the one hand compounds containing a benzene radical substituted by the group $R^1$—O—OC—X—. As groupings of said kind there enter into consideration:

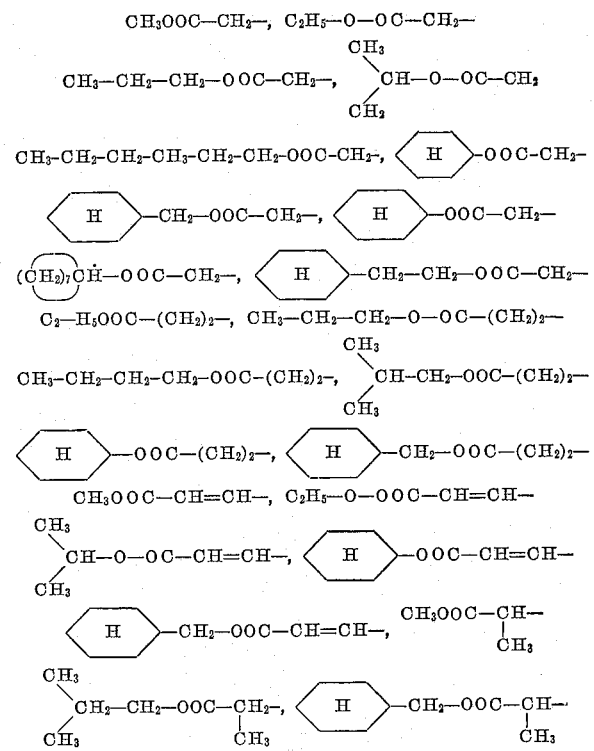

For example, $R^2$ may stand for ethyl, propyl, isopropyl, butyl, isobutyl, sec. butyl, straight-chained or ramified amyl (pentyl), hexyl, heptyl or octyl; the radicals corresponding to the above-mentioned hydrocarbon radicals, with one ethylenic double linkage, such, for instance, as allyl or crotyl, furthermore alkyls having 2 to 8 carbon atoms and carrying a mercapto group such as β-mercapto-ethyl or higher mercapto alkyls. Furthermore, $R^2$ may stand for γ-methoxypropyl, δ-methoxy-n-butyl, β-ethoxyethyl, γ-ethoxypropyl, δ-ethoxybutyl or higher alkyloxyethyls, higher alkyloxypropyls, higher alkyloxybutyls as well as the corresponding groups carrying a sulfur atom instead of the oxygen atom or the member —SO—. $R^2$ may also stand for benzyl, α-phenyl-ethyl, β-phenylethyl, α-phenylpropyl, β-phenylpropyl or γ-phenylpropyl or phenylbutyls.

In the sense of the invention there are preferred compounds containing as $R^2$ a cycloaliphatic hydrocarbon radical which may be substituted by alkyl or alkoxy or linked to the nitrogen atom by means of alkylene. As radicals of this type there are mentioned: cyclopentyl, cyclohexyl, cycloheptyl, cyclooctyl, methylcyclohexyl, ethylcyclohexyl, propylcyclohexyl, isopropylcyclohexyl, methoxycyclohexyl, ethoxycyclohexyl, propoxycyclohexyl, and isopropoxycyclohexyl, the alkyl or alkoxy groups being present in 2-, 3- or, preferably, in 4-position in cis- as well as in trans-position, cyclohexylmethyl, α-cyclohexyl-ethyl, β-cyclohexylethyl, cyclohexylpropyls, endomethylene-cyclohexyl (2,2,1-tricycloheptyl), endoethylene-cyclohexyl (2,2,2-tricyclooctyl), endomethylene-cyclohexenyl, endoethylene - cyclohexenyl, endomethylene - cyclohexylmethyl, endoethylene-cyclohexylmethyl, endomethylene-cyclohexenylmethyl or endoethylene-cyclohexenyl-methyl, α-phenylcylopropyl or β-phenylcyclopropyl in the cis- as well as in the trans-form.

Finally, there are suitable as $R^2$ heterocyclic rings containing in addition to 4 to 5 carbon atoms likewise one oxygen or sulfur atom and up to 2 double linkages and bound to the adjacent nitrogen atom either directly or by means of a methylene group. Examples of said heterocyclic rings are:

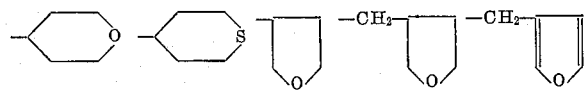

The sulfonyl-urea derivatives obtainable according to the process of the present invention are valuable medicaments characterized by a strong, and above-all a long-lasting hypoglycemic action. Their blood sugar lowering action could be ascertained, for instance, in rabbits by administering to the animals the products obtained according to the invention in the usual doses of 400 milligrams/kilogram and by determining the blood sugar value according to the known method of Hagedorn-Jensen over a prolonged period.

It was found, for instance, that N-(4-carbethoxymethyl-benzenesulfonyl)-N'-cyclooctyl-urea provokes a maximum hypoglycemic effect of 50% after 6 hours which after a period of 24 hours still amounts to 35%. By administering N-(4-carbethoxymethyl-benzenesulfonyl)-N'-(4-isopropylcyclohexyl)-urea the blood sugar level is reduced by 50% and after a period of 24 hours the reduction still amounts to 16%. In comparison thereto the N-(4-methyl-benzenesulfonyl)-N'-n-butyl-urea known as oral antidiabetic and used as a medicament, in a comparison test provokes a blood sugar lowering by about 40% which after 24 hours is equal to zero.

The products obtained according to the process of the present invention are to be used, preferably, for the production of preparations showing hypoglycemic properties to be orally administered in the treatment of diabetes mellitus. They can be applied such or in the form of their salts or in the presence of substances causing salt formation. For the salt formation there can be used: alkaline agents such as alkali metal hydroxides, alkaline earth metal hydroxides, alkali metal carbonates or alkaline earth metal carbonates, alkali metal bicarbonates or alkaline earth metal bicarbonates. As medicinal preparations there are preferred tablets containing in addition to the products of the present invention the usual adjuvants and carrier substances such, for instances, as talc, starch, lactose, tragacanth, magnesium stearate and the like.

A preparation containing the above-mentioned benzene-sulfonyl-ureas as active substance, for instance, a tablet or a powder, with or without the above-mentioned additions, is favorably brought into a suitable dosage unit form. The dose chosen should comply with the activity of the benzenesulfonyl-urea used and the desired effect. Favorably, the dosage per unit amounts to about 10 to 100 milligrams but considerably higher or lower dosage units can likewise be used which, if desired, are divided or multiplied prior to application.

The following examples serve to illustrate the invention but they are not intended to limit it thereto:

EXAMPLE 1

*N-(4-carbethoxy-methyl-benzenesulfonyl)-N'-cyclo-hexyl-urea*

50 grams of 4-sulfonamido-phenyl-acetic acid (produced from phenylacetic acid by chlorosulfurization and treatment of the acid chloride by means of ammonia; melting point 174–176° C.) are converted by boiling in absolute ethanol (350 milliliters) in the presence of 8 grams of concentrated sulfuric acid and heating for 6 hours under reflux into the ester. Melting point: 173–175° C.

46 grams of the 4-carbethoxy-methyl-benzenesulfonamide thus obtained are suspended in 150 milliliters of acetone and dilute sodium hydroxide solution is added (containing 8 grams of NaOH). Dissolution occurs. At 10–15° C., 25.2 grams of cyclohexyl-isocyanate are slowly dropped in while stirring is effected at room temperature for 1 hour. A small amount of separated substance is filtered off with suction, the filtrate is acidified by means of dilute hydrochloric acid, filtered off with suction; the product obtained is dissolved in ammonia of about 1% strength, filtered again, precipitated by means of dilute hydrochloric acid and the N-(4-carbethoxy-methyl-benzenesulfonyl)-N'-cyclohexyl-urea thus obtained is finally crystallized. After recrystallization from ethanol the product obtained in a yield of 33 grams melts at 139–141° C.

In an analogous manner there are obtained:
from 4-carbethoxy-methyl-benzenesulfonamide and cyclooctyl-isocyanate:
  N-(4-carbethoxy-methyl-benzenesulfonyl)-N'-cyclooctyl-urea of a melting point of 109–111° C. (from dilute ethanol);
from 4-carbo-n-butoxy-methyl-benzenesulfonamide (prepared by esterification of 4-sulfonamido-phenylacetic acid with n-butanol; melting point 125–126° C.) and cyclohexyl-isocyanate:
  N-(4-carbo-n-butoxy-methyl-benzenesulfonyl)-N' cyclohexyl-urea of a melting point of 136–138° C. (from isopropanol);
from 4-carbo-n-butoxy-methyl-benzenesulfonamide and cyclooctyl-isocyanate:
  N-(4-carbo-n-butoxy-methyl-benzenesulfonyl)-N'-cyclooctyl-urea of a melting point of 112–114° C. (from isopropanol);
from 4-carbo-n-propoxy-methyl-benzensulfonamide (prepared by esterification of 4-sulfonamido-phenyl-acetic acid with n-propyl alcohol, melting point 152–154° C.) and cyclohexyl-isocyanate:
  N-(4-carbo-n-propoxy-methyl-benzenesulfonyl)-N'-cyclohexyl-urea of a melting point of 139–141° C. (from ethanol);
from 4 - carbo - [cyclohexylmethoxy]-methylbenzenesulfonamide (prepared from 4-sulfonamido-phenylacetic acid and hexahydrobenzyl alcohol, melting point 100–112° C.):
  N-(4-carbo-[cyclohexylmethoxy]-methyl-benzenesulfonyl)-N'-cyclohexyl-urea of a melting point of 155–157° C. (from methanol);
from 4-carbethoxyethyl-benzenesulfonamide (prepared from 4-sulfonamido-phenylpropionic acid and ethanol, melting point 80–81° C.) and cyclooctyl-isocyanate:
  N-[4-β-(carbethoxy)-ethyl-benzenesulfonyl]-N'-cyclooctyl-urea of a melting point of 92–94° C. (from aqueous methanol);
from 4-sulfonamido-phenylpropionic acid-n-propylester (melting point 85–86° C.) and cyclohexyl-isocyanate:
  N-[4-β-(carbo-n-propoxy)-ethyl-benzenesulfonyl]-N'-cyclohexyl-urea of a melting point of 114–116° C. (from ethanol);
from 4-sulfonamido-phenylpropionic acid - n - butylester and cyclohexyl-isocyanate:
  N-[4-β-(carbo-n-butoxy)-ethyl-benzenesulfonyl]-N'-cyclohexyl-urea of a melting point of 92–94° C. (from isopropanol);
from 4-carbethoxy-methyl-benzenesulfonamide and 4-isopropyl-cyclohexyl-isocyanate:
  N-(4-carbethoxy-methyl-benzenesulfonyl)-N'-(4-isopropyl-cyclohexyl)-urea of a melting point of 152° C. (from ethanol);
from 4-carbethoxy-methyl-benzenesulfonamide and 4-ethyl-cyclohexyl-isocyanate:
  N-(4-carbethoxy-methyl-benzenesulfonyl)-N'-(4-ethyl-cyclohexyl)-urea of a melting point of 157° C.

EXAMPLE 2

N-(4-carbo-n-butoxy-methyl-benzenesulfonyl)-N'-n-butyl-urea 19 grams of N-(4-carbo-n-butoxy-methyl-benzenesulfonyl)-urea (prepared by reaction of the corresponding benzenesulfonamide with potassium cyanate in alcohol, melting point 131–133° C.) are heated to the boil in 300 milliliters of toluene together with 4 grams of glacial acetic acid and 4.9 grams of n-butylamine for 90 minutes with stirring and reflux. The cooled clear solution is extracted three times with 200 milliliters of ammonia of 1% strength each time. By acidification of the ammoniacal extracts by means of dilute hydrochloric acid a crystalline precipitate of N-(4-carbo-n-butoxy-methyl-benzenesulfonyl)-N'-n-butyl-urea is obtained which after filtration with suction, washing out with water and drying is recrystallized from ethanol. The yield amounts to 13.5 grams, the melting point to 119–121° C.

In analogous manner there are obtained:
from N - (4 - carbo-n-propoxy-methyl-benzenesulfonyl)-urea (prepared from the corresponding sulfonamide with potassium cyanate, melting point 137–139° C.) and cyclootcylamine:
  N-(4-carbo-n-propoxy-methyl-benzenesulfonyl)-N'-cyclooctyl-urea of a melting point of 110–112° C. (from ethanol);
from N-(4-carbo-n-butoxy-methyl-benzenesulfonyl)-urea and benzylamine:
  N-(4-carbo-n-butoxy-methyl-benzenesulfonyl) N'-benzyl-urea, melting point 143–145° C. (from ethanol);
from 4 - β-(carbo-n-propoxy)-ethyl-benzenesulfonyl-urea (prepared from the corresponding amide with potassium cyanate in ethanol, melting point 110–112° C.) and cyclocylamine:
  N-[4-β-(carbo-n-propoxy)-ethyl-benzenesulfonyl] N'-cyclooctyl-urea, metling point 90–92° C. (from ethanol);
from N - 4 - β - (carbethoxy)-ethyl-benzenesulfonyl-urea (prepared from the corresponding sulfonamide with potassium cyanate, melting point 99–101° C.) and cyclohexylamine:
  N-[4-β-(carbethoxy)-ethyl-benzenesulfonyl]-N'-cyclohexyl-urea, melting point 145–147° C. (from ethanol);
from N-4-β-(carbethoxy)-ethyl-benzenesulfonyl-urea and 4-ethyl-cyclohexylamine:
  N-[4-β-(carbethoxy)-ethyl-benzenesulfonyl]-N'-(4-ethyl-cyclohexyl)-urea, melting point 119–121°C. (from ethanol);
from N-(4-carbethoxy-methyl-benzenesulfonyl)-urea of a melting point of 158–160° C. and cycloheptylamine:
  N-(4-carbethoxy-methyl-benzenesulfonyl)-N'-cycloheptyl-urea, melting point 118° C. (from ethanol/water).

EXAMPLE 3

N-[4-β-(carbethoxy-vinyl)-benzenesulfonyl]-N'-cyclooctyl-urea.

15.3 grams of 4-β-(carbethoxy-vinyl)-benzenesulfonamide (prepared from 4-(β-carboxy-vinyl)-benzenesulfonamide by esterification, melting point 122–124° C.) are suspended in 60 milliliters of acetone. At 0° C., 30 milliliters of 2 N-sodium hydroxide solution are added. 9.3 grams of cyclooctyl-isocyanate are dropwise added, the temperature not being allowed to exceed 5° C. After stirring for a further 3 hours the mixture is diluted with water, filtered and the filtrate is acidified by means of acetic acid. The crystalline N-[4-β-(carbethoxyvinyl)-benzenesulfonyl]-N'-cyclooctyl-urea is recrystallized from methanol and melts at 161–163° C.

In an analogous manner there are obtained:
from 4-(β-carbethoxy-vinyl)-benzenesulfonamide and the corresponding isocyanates:

N-[4-(β-carbethoxy-vinyl)-benzenesulfonyl]-N'-cyclohexylurea, melting point 176–177° C. (from methanol);

N-[4-(β-carbethoxy-vinyl)-benzenesulfonyl]-N'-butyl-urea, melting point 133–134.5° C. (from methanol);

N-[4-(β-carbethoxy-vinyl)-benzenesulfonyl]-N'-(4'-methylcyclohexyl)-urea, melting point 167–168.5° C. (from methanol);

from 4-(β - carbo - n - butoxy - vinyl) - benzenesulfonamide (melting point 104–106° C.) and the corresponding isocyanates the following substances are obtained in an analogous manner:

N-[4-(β-carbo-n-butoxy-vinyl)-benzenesulfonyl]-N'-cyclooctyl-urea, melting point 143–145° C. (from methanol);

N-[4-(β-carbo-n-butoxy-vinyl)-benzenesulfonyl]-N'-cyclohexylurea, melting point 166–168° C. (from methanol);

N-[4-(β-carbo-n-butoxy-vinyl)-benzenesulfonyl]N'-butyl-urea, melting point 104–106° C. (from methanol);

N-[4-(β-carbo-n-butoxy-vinyl)-benzenesulfonyl]-N'-(4'-methyl-cyclohexyl)-urea, melting point 169–170° C. (from methanol).

EXAMPLE 4

*N-[4-(β-carbo-n-butoxyethyl)-benzenesulfonyl]-N'-(4'-methyl-cyclohexyl)-urea.*

10 grams of N-[4-(β-carbo-n-butoxy-vinyl)-benzenesulfonyl]-N'-(4'-methylcyclohexyl)-urea are suspended in 150 milliliters of methanol and hydrogenated in an oscillating vessel at room temperature in palladium. The hydrogen absorption terminated, the catalyst is filtered off with suction, the filtrate is concentrated and the residue is triturated with ether. The pure crystals of N-[4-(β-carbo - n - butoxyethyl) - benzenesulfonyl] - N' - (4-methyl-cyclohexyl)-urea are obtained which melt at 108–110° C.

EXAMPLE 5

*N-(4-carbethoxy-methyl-benzenesulfonyl)-N'-cyclohexyl-urea.*

23 grams of N-4-(carbethoxy-methyl-benzenesulfonyl)-carbamic acid methyl ester (prepared by reaction of the corresponding sulfonamide with chloroformic acid ester, melting point 118–120° C.), 200 milliliters of dioxane and 7.6 grams of cyclohexylamine are heated to the boil for 1 hour under reflux. The methyl alcohol that forms is distilled off. After concentration to two thirds of the volume under reduced pressure, water and dilute hydrochloric acid are added and the precipitated crystalline substance is filtered off with suction. The N-(4-carbethoxy-methyl-benzenesulfonyl)-N'-cyclohexyl-urea thus obtained after recrystallization from ethanol melts at 139–141° C.

We claim:
1. A compound selected from the group consisting of (A) a benzene sulfonyl urea of the formula

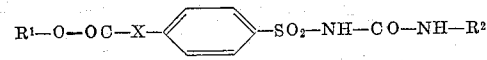

in which
R¹ is a member selected from the group consisting of lower alkyl, cycloalkyl of 5 to 8 carbon atoms and cycloalkyl alkyl of 5 to 8 ring carbon atoms
X is a saturated hydrocarbon group of 1 to 2 carbon atoms and a vinyl group
R² is a member selected from the group consisting of
  (a) alkyl, alkenyl and mercaptoalkyl of 2 to 8 carbon atoms each (b) alkoxyalkyl, alkylmercaptoalkyl and alkylsulfinylalkyl of 4 to 8 carbon atoms each, at least two of which carbon atoms forming the alkylene portion of the alkoxyalkyl, alkyl-mercaptoalkyl and alkylsulfinylalkyl,
  (c) lower phenylalkyl, phenyl-cyclopropyl,
  (d) lower cyclohexylalkyl, cycloheptylmethyl, cycloheptylethyl and cyclooctylmethyl,
  (e) endoalkylene-cyclohexyl, endoalkylene-cyclohexenyl, endoalkylene-cyclohexylmethyl and endoalkylene-cyclohexenylmethyl of 1 to 2 endoalkylene carbon atoms each,
  (f) lower alkyl-cyclohexyl, lower alkoxy-cyclohexyl,
  (g) cycloalkyl of 5 to 8 carbon atoms,
  (h) cyclohexenyl, cyclohexenylmethyl,
  (i) a heterocyclic radical of the formula

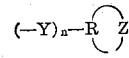

wherein Z is oxygen or sulfur and wherein R is selected from the class consisting of a hydrocarbon of 4 to 5 carbon atoms, and hydrocarbons of 4 to 5 carbon atoms containing up to 2 ethylenic bonds, and wherein Y is a methylene group joined to the nitrogen atom of the benzenesulfonyl urea and n is 0 or 1;
and (B) a pharmaceutically acceptable basic salt thereof.

2. Compound of claim 1 wherein R¹ is alkyl.
3. Compound of claim 1 wherein X is methylene.
4. Compound of claim 1 wherein R² is cyclohexyl.
5. Compound of claim 1 wherein R² is lower alkyl cyclohexyl.
6. N - (4 - carbethoxymethyl - benzenesulfonyl) - N'-cyclooctyl urea.
7. N - (4 - carbethoxymethyl - benzenesulfonyl) - N'-(4-isopropyl-cyclohexyl) urea.
8. N - (4 - carbethoxymethyl - benzenesulfonyl) - N-cyclohexyl urea.
9. Compounds of claim 1 wherein X is vinyl.
10. Compounds of claim 1 wherein X is vinyl and R² is cyclohexyl, lower alkyl cyclohexyl, or cyclooctyl.

References Cited

UNITED STATES PATENTS

| | | | |
|---|---|---|---|
| 2,793,977 | 5/1957 | Caspe | 167—65 |
| 2,974,166 | 3/1961 | Alfred et al. | 260—553 |
| 3,005,022 | 10/1961 | McLamore et al. | |
| 3,063,903 | 11/1962 | Wright | 167—65 |
| 3,072,720 | 1/1963 | Wright | 260—553 |
| 3,211,615 | 10/1965 | McLamore | 167—65 |

FOREIGN PATENTS

| | | |
|---|---|---|
| 831,044 | 3/1960 | Great Britain. |
| 835,811 | 5/1960 | Great Britain. |

OTHER REFERENCES

Bitny-Szlachto, Acta Polon. Pharm. vol. 10, pages 34 and 44 (1953).
Chemical Abstracts I, vol. 53, col. 9999a (1959).
Chemical Abstracts II, vol. 47, col. 2880d (1953).
Chemical Abstracts III, vol. 58, col. 4455e (1963).
Momose et al., J. Pharm. Soc., Japan, vol. 81, pages 1045–1047 (1961).
Ruschig et al., Arnz. Forsch., vol. 8, page 450 (1958).

JOHN D. RANDOLPH, *Primary Examiner.*

JULIUS S. LEVITT, *Examiner.*

MARTIN J. COHEN, *Assistant Examiner.*